United States Patent [19]
Yoshimura et al.

[11] Patent Number: 5,763,537
[45] Date of Patent: Jun. 9, 1998

[54] POLYIMIDE BASED RESIN COMPOSITION

[75] Inventors: Tomomi Yoshimura; Wataru Yamashita, both of Kanagawa-ken; Shoji Tamai, Fukuoka-ken; Akihiro Yamaguchi, Kanagawa-ken, all of Japan

[73] Assignee: Mitsui Toatsu Chemicals, Inc., Tokyo, Japan

[21] Appl. No.: 577,517

[22] Filed: Dec. 22, 1995

[30] Foreign Application Priority Data

| | | | |
|---|---|---|---|
| Jan. 13, 1995 | [JP] | Japan | 7-003740 |
| Mar. 16, 1995 | [JP] | Japan | 7-057522 |
| Mar. 24, 1995 | [JP] | Japan | 7-065657 |
| Mar. 24, 1995 | [JP] | Japan | 7-065658 |
| Jun. 21, 1995 | [JP] | Japan | 7-154243 |
| Jul. 18, 1995 | [JP] | Japan | 7-181539 |

[51] Int. Cl.$^6$ ............... C08L 67/00; C08L 79/08
[52] U.S. Cl. ............................. 525/436; 525/420
[58] Field of Search ........................... 525/436, 420

[56] References Cited

U.S. PATENT DOCUMENTS 5,571,875  11/1996  Tsutsumi et al. .............. 525/425

FOREIGN PATENT DOCUMENTS 0349720  1/1990  European Pat. Off. .
0523240  1/1993  European Pat. Off. .

*Primary Examiner*—Ana Woodward
*Attorney, Agent, or Firm*—Burns, Doane, Swecker & Mathis, L.L.P.

[57] ABSTRACT

A is a polyimide based resin molding composition comprising 100 parts by weight of crystalline polyimide having recurring structural units of the formula (1):

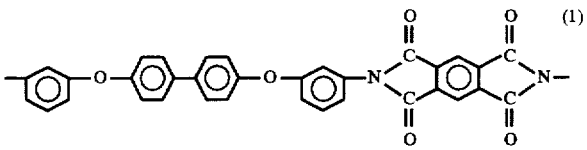

and 1~50 parts by weight of crystallization accelerators selected from bisimide compounds of specific structure, a mixture of bisimide compounds, and imide based oligomer. The composition remarkably accelerates the crystallization velocity of polyimide of the formula (1), crystallization can be completed within a greatly reduced cooling time after melt processing, and the crystallized polyimide resin has excellent properties.

6 Claims, No Drawings

POLYIMIDE BASED RESIN COMPOSITION

BACKGROUND OF THE INVENTION

1. Field of the Invention

The present invention relates to a polyimide based molding composition which comprises crystalline polyimide and a bisimide compound and has a remarkably high crystallization velocity, and a crystalline polyimide resin obtained from the composition.

More particularly, the present invention relates to a molding resin composition of crystalline polyimide which enables in the processing of crystalline polyimide, crystallization within a greatly reduced time in a cooling step after melt-processing, and a crystalline polyimide resin which is obtained by processing the composition and comprises crystalline polyimide and a bisimide compound.

2. Related Art of the Invention

Polyimide has an essentially outstanding heat resistance and additionally is excellent in mechanical properties, chemical resistance, flame retardance and electrical characteristics and thus has been widely used in the field of molding materials, composite materials and electric and electronic parts.

Vespel (Trade Mark of E. I. du Pont de Nemours & Co.) and Upilex (Trade Mark of Ube Industries) have been already known as polyimide for molding materials and composite materials. These types of polyimide, however, are insoluble and infusible, and have difficulty in processing, and thus must be processed by using a specific techniques such as sinter molding by way of polyamic acid which is a precursor of polyimide. Such a techniques are difficult to provide processed articles of complex shape and finishing operation such as cutting is further required in order to obtain satisfactory molded articles. Consequently, problems have been encountered concerning processing and cost.

On the other hand, polyimide which has recurring structural units of the formula (A):

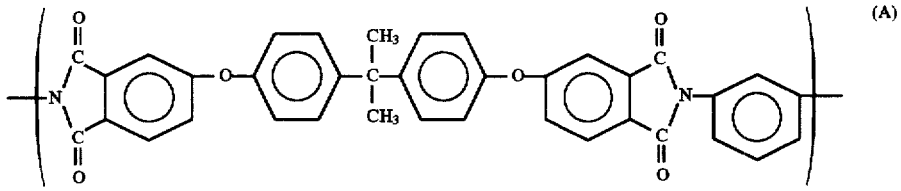

[Ultem (Trade Mark of G E Co.)] has been known as injection moldable, thermoplastic polyetherimide which has improved processing ability (U.S. Pat. No. 3,730,946, 3,847,867 and 3,847,869). However, the polyetherimide is completely amorphous, has a glass transition temperature (Tg) of 215° C., and is thus insufficient in heat resistance. That is, for example, distortion temperature under load (hereinafter referred to simply as DTUL) which is a substantially critical temperature for use is 200 ° C. in the case of Ultem without reinforcements and 212° C. in the case of Ultem containing 30% by weight of carbon fiber, respectively. These temperatures are not so high as a super engineering plastic.

Further, polyimide which has recurring structural units of the formula (B):

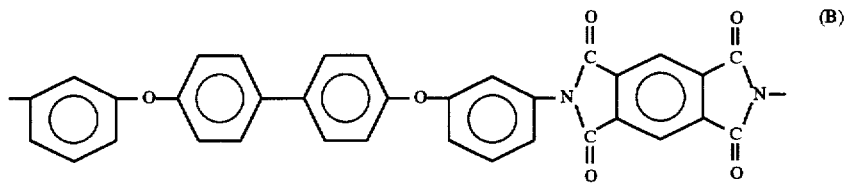

[AURUM (Trade Mark of Mitsui Toatsu Chemicals Inc.)] has been developed as injection moldable, thermoplastic polyimide which has improved processing ability (Japanese Laid-Open Patent SHO 62-68817). The polyimide has a glass transition temperature of 250° C., and thus DTUL is 238° C. in the case of AURUM without reinforcements and 248° C. in the case of AURUM containing 30% by weight of carbon fiber, respectively. That is, AURUM has higher heat resistance than the above polyetherimide, Ultem.

Further, AURUM is crystalline polyimide and thus a sufficiently crystallized state is desired in order to exhibit essentially excellent, various properties of the polyimide.

However, in processing the polyimide, AURUM solidifies in amorphous form when quickly cooled from a molten state in the melt processing step. Consequently, it is necessary to slow down the rate of cooling and to have a long cooling time in order to achieve satisfactory crystallization. That is, AURUM is in the amorphous state at a cooling rate of about 10° C./min or more. Crystallization can be achieved by cooling at a rate of less than 10° C./min or by subjecting the polyimide to a specific heat treatment (annealing ). Such crystallized polyimide has extraordinarily high heat resistance, for example, DTUL of crystallized AURUM is 260° C. without reinforcements and 349° C. in the presence of 30% by weight of carbon fiber.

Various methods have been investigated for crystallization of polyimide or for controlling the rate of crystallization.

Japanese Laid-Open Patent HEI 03-47837 has disclosed a process for introducing a prescribed amount of a third monomer ingredient by copolymerization into polyimide having recurring structural units of the formula (B). The process, however, is used for maintaining an amorphous state for a long time in order to delay crystallization.

On the other hand, U.S. Pat. No. 4,906,730 has disclosed a process for adding a bisimide compound to polyetherimide in order to accelerate crystallization. However, polyetherimide in the process is characterized in that both the diamine unit and the tetracarboxylic dianhydride unit in the recurring structural units have ether bonds, and leads to insufficient improvement in the crystallization velocity even though the bisimide compound is added.

Polyimide of the invention is crystalline polyimide. Thus, in order to enhance practical utility of the polyimide, it is strongly desired to improve hot-melt flowability in the processing step and melt-flow stability at high temperatures, and additionally to attain essential crystallinity of the polyimide within a short cooling time by increasing the cooling rate after melt-processing. Such process enables the crystallization of a molded article in the mold within a short cooling time in the injection molding process and a specific treatment such as annealing becomes unnecessary.

SUMMARY OF THE INVENTION

One object of the invention is, in the melt-processing of crystalline polyimide having recurring structural units of the formula (1) below, to provide a crystalline polyimide resin having essential crystallinity of polyimide by crystallizing a composition comprising a bisimide compound as a crystallization accelerator within a short cooling time under an increased rate of cooling after melt-processing.

Another object of the invention is to provide a polyimide based molding composition comprising said polyimide and a bisimide compound, which provides the crystalline polyimide resin.

A further object of the invention is to provide a molded article comprised of a crystalline polyimide resin by melt-processing the polyimide based molding resin composition comprising the crystalline polyimide and the bisimide compound.

As a result of an intensive investigation in order to accomplish these objects, the present inventors have found that, in the melt-processing of the polyimide having recurring structural units of the formula (1), use of the polyimide after adding a specific amount of crystallization accelerators selected from a bisimide compound having a specific structure, an imide based oligomer and a mixture of specific bisimide compounds can remarkably accelerate the crystallization velocity of the crystalline polyimide even under an increased cooling rate after melt-processing, and can cause crystallization within a short time to the essential crystallinity of the polyimide. Thus, the invention has been completed.

That is, one aspect of the present invention is a polyimide based molding resin composition comprising:

(A) 100 parts by weight of crystalline polyimide having recurring structural units of the formula (1):

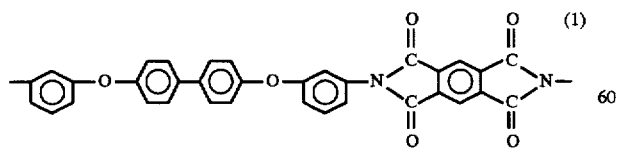

and (B) 1~50 parts by weight of one or more crystallization accelerator selected from the group consisting of:
(a) one or more bisimide compound selected from a bisimide compound represented by the general formula (2):

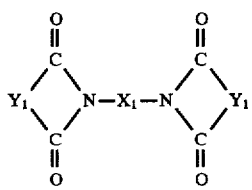

wherein $X_1$ is

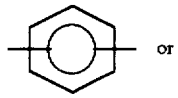

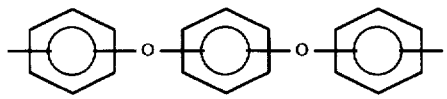

and $Y_1$ is

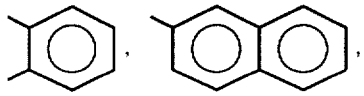

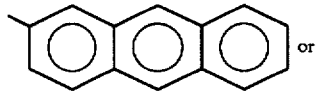

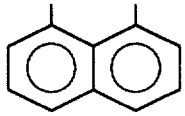

and a bisimide compound represented by the general formula (3):

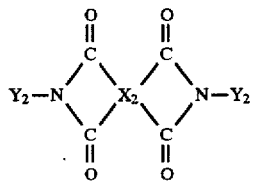

wherein $X_2$ is

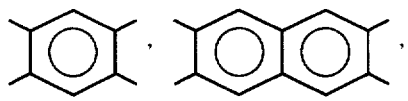

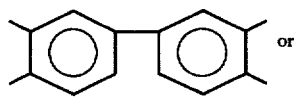

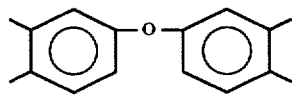

and $Y_2$ is

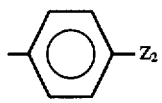

wherein $Z_2$ is —H, —CH$_3$, —C$_2$H$_5$, —C$_3$H$_7$, —OCH$_3$,

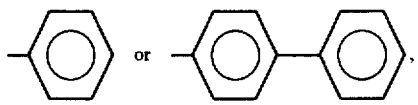

(b) an amide based oligomer of the formula (4):

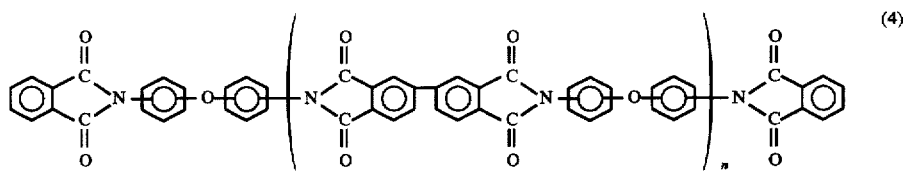

wherein n is an integer of 1–3, and (c) a mixture of a bisimide compound of the formula (2-1):

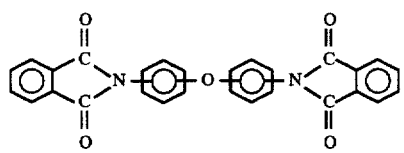

with a bisimide compound represented by the general formula (3-2):

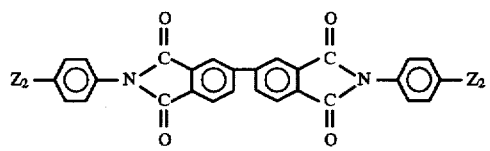

wherein $Z_2$ is the same as in the general formula (3).

The crystallization accelerators which can be preferably used in the composition are a bisimide compound of the formula (2-2):

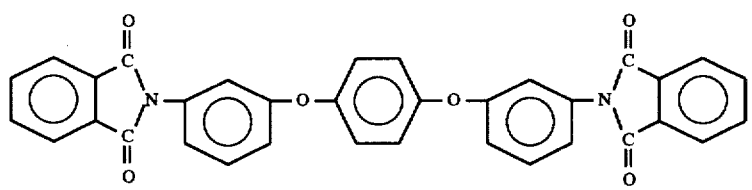

a bisimide compound of the formula (2-3):

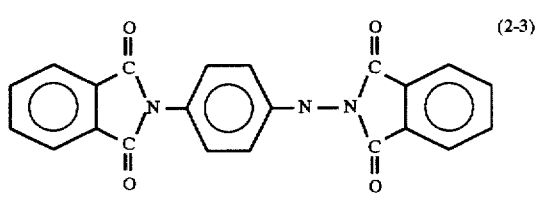

a bisimide compound represented by the general formula (3-1):

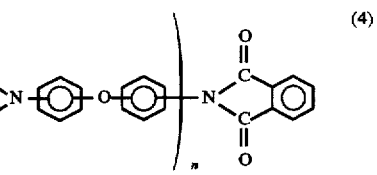

wherein $Z_2$ is —H, —CH$_3$, —C$_2$H$_5$, —C$_3$H$_7$, —OCH$_3$,

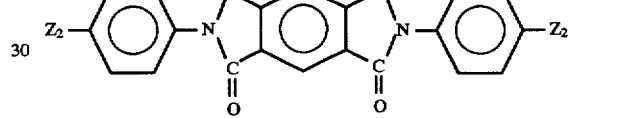

a bisimide compound of the formula (3-2):

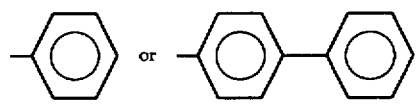

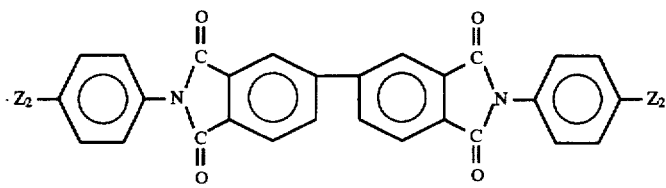

wherein $Z_2$ is —H, —CH$_3$, —C$_2$H$_5$, —C$_3$H$_7$, —OCH$_3$,

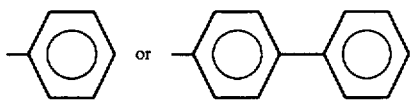

an imide based oligomer of the formula (4):

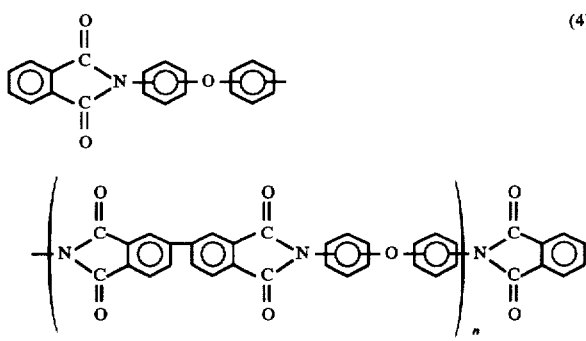

where n is an integer of 1–3, and a mixture of a bisimide compound of the formula (2-1):

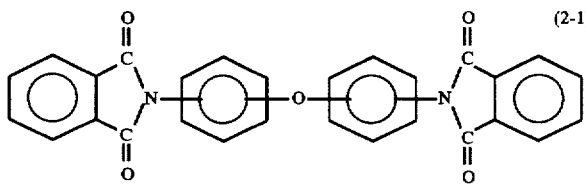

with a bisimide compound represented by the general formula (3-2):

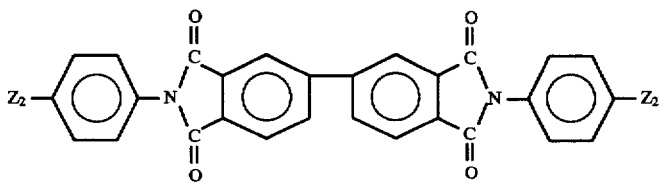

wherein $Z_2$ is the same as in the general formula (3).

Polyimide for use in the invention which has recurring structural units of the formula (1) has excellent properties and is used for processing. Melt flowability and flow stability have been already improved in order to enhance practical utility. The polyimide has essentially high crystallinity. However, in order to realize the high crystallinity in a molded article, cooling after melt-processing must be carried out at a considerably slow rate for a long time. On the other hand, the polyimide based molding resin composition of the invention can provide a sufficiently crystallized polyimide resin within a short cooling time by greatly increasing the cooling rate.

The composition comprises the bisimide compound or the imide based oligomer. These ingredients have the above effect and are additionally effective for improving the melt-flowability of polyimide used in the invention. Various properties of the crystallized polyimide resin obtained by melt-processing have no effect on the essential properties of polyimide.

That is, the present invention greatly extends practical utility of polyimide having recurring structural units of the formula (1) in the invention, maintains heat resistance, mechanical properties, chemical resistance, melt-processing ability and other essential properties of polyimide at the highest level, remarkably improves crystallization velocity, and further enables a significant reduction in the processing time.

Further, the polyimide based crystalline resin of the invention has an improved distortion temperature under load (DTUL) and can also markedly enhance heat resistance and mechanical properties of the amorphous polyimide of the formula (1).

DETAILED DESCRIPTION OF THE INVENTION

Polyimide which can be used for the polyimide ingredient (A) in the invention is classified into crystalline polyimide and has recurring structural units of the formula (1):

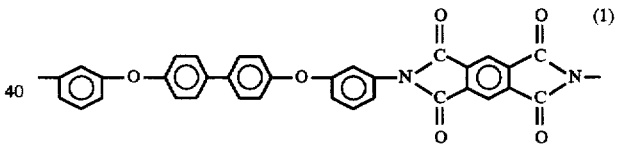

The polyimide can be prepared by using 4,4'-bis(3-aminophenoxy) biphenyl and pyromellitic dianhydride as monomers and carrying out the reaction according to a known preparation process of polyimide.

Polyimide of the formula (1) which is prepared by such process can be used for the invention. Already marketed polyimide, AURUM (Trade Mark of Mitsui Toatsu Chemicals Inc.) can also be used for the invention.

Polyimide which is obtained by capping the end of a polymer chain consisting of the above recurring structural units with dicarboxylic anhydride such as phthalic anhydride or monoamine such as aniline and has improved melt-flowability and flow stability can also be used for the invention. No particular restriction is imposed upon the preparation process of such end-capped polyimide. Various known processes can be used for the preparation.

The crystallization accelerators which can be used for the ingredient (B) in the invention are the bisimide compound [ingredient (a)], the imide based oligomer [ingredient (b)], or the mixture of the specific bisimide compounds [ingredient (c)], as illustrated below.

The bisimide compound [ingredient (a)] is briefly divided into two types of bisimide compound. Both types of bisimide can accelerate crystallization in the cooling step after melt-processing by previously adding to the above polyimide, and thus can greatly reduce the time required for crystallization of polyimide.

One type (hereinafter referred to sometimes as type A bisimide compound) is a compound which can be specified by the structure of the general formula (2):

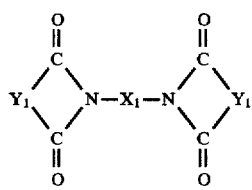
(2)

wherein $X_1$ is

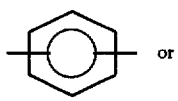
or

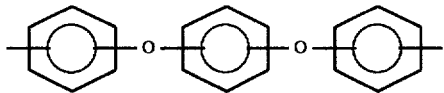

and $Y_1$ is

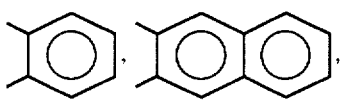

or

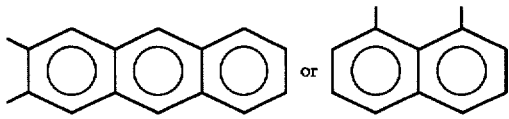

Most preferred type A bisimide compounds include compounds of the formula (2-2).

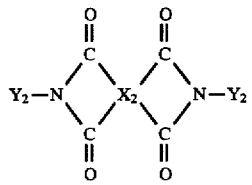
(3)

wherein $X_2$ is

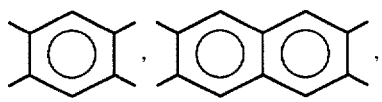

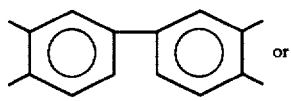 or

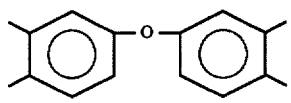

and $Y_2$ is

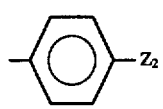

wherein $Z_2$ is —H, —$CH_3$, —$C_2H_5$, —$C_3H_7$, —$OCH_3$,

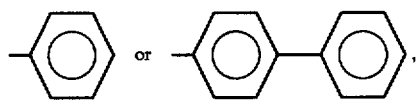

Preferred type B bisimide compounds include compounds of the general formula (3-1) and the general formula (3-2).

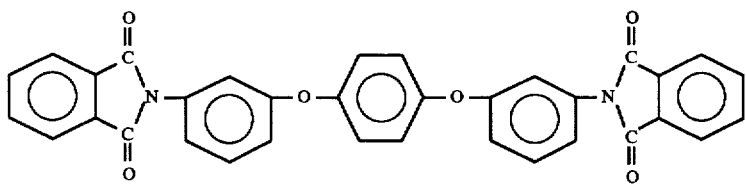
(2-2)

Another type (hereinafter referred to sometimes as type B bisimide compound) is a compound which can be specified by the structure of the general formula (3):

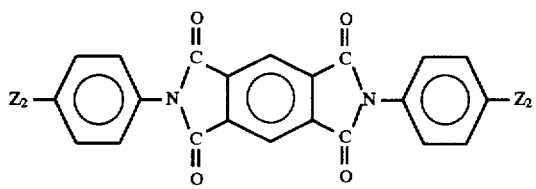
(3-1)

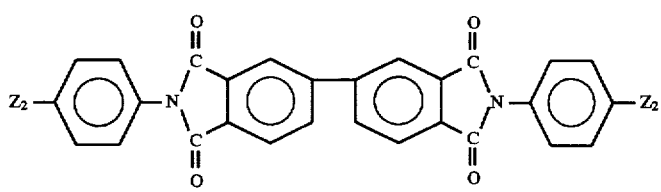
(3-2)

wherein $Z_2$ is the same as above.

The imide based oligomer [ingredient (b)] which can be used for the crystallization accelerator is an oligomer of the formula (4):

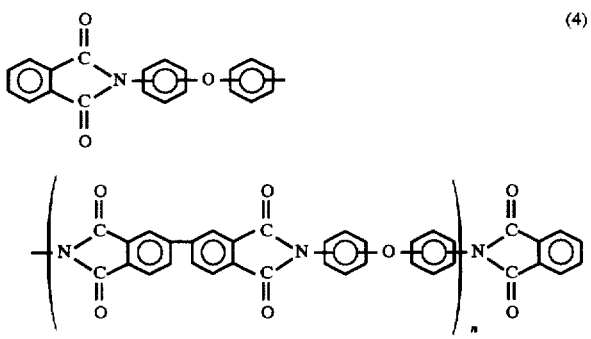
(4)

wherein n is an integer of 1~3.

The mixture of specific bisimide compounds [ingredient (c)] which can also be used as a crystallization accelerator is a mixture of the bisimide compound of the formula (2-1):

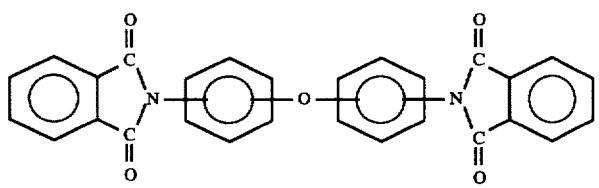
(2-1)

with a bisimide compound represented by the general formula (3-2):

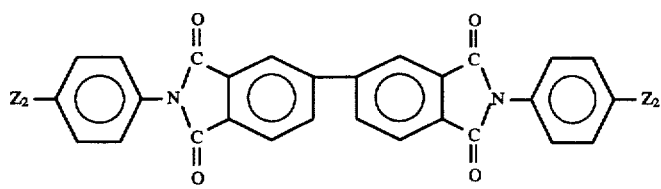
(3-2)

wherein $Z_2$ is the same as in the general formula (3).

These bisimide compounds can be prepared by the following reactions.

That is, the type A bisimide compounds can be prepared by reacting 1 mol of a diamine compound with approximately 2 mol of dicarboxylic anhydride in an organic solvent according to common procedures. The type B bisimide compounds can be prepared by reacting 1 mol of tetracarboxylic dianhydride with approximately 2 mol of a monoamine compound in an organic solvent according to common procedures. No particular restriction is put upon the reaction procedure as long as the desired bisimide compound can be obtained.

Preparation of the bisimide compounds will be illustrated in detail hereinafter.

Essential raw material compounds which can be used for the preparation of bisimide compounds of the invention are as follows.

(1) Diamine compounds which can be used for the preparation of type A bisimide compounds are
4,4'-bis(3-aminophenoxy)benzene,
3,4'-bis(3-aminophenoxy)benzene,
3,3'-bis(3-aminophenoxy)benzene,
4,4'-bis(4-aminophenoxy)benzene,
3,4'-bis(4-aminophenoxy)benzene,
3,3'-bis(4-aminophenoxy)benzene,
p-phenylenediamine,
m-phenylenediamine, and
o-phenylenediamine.

Dicarboxylic anhydrides are phthalic anhydride,
2,3-naphthalenedicarboxylic anhydride,
1,8-naphthalenedicarboxylic anhydride, and
2,3-anthracenedicarboxylic anhydride.

(2) Tetracarboxylic dianhydride which can be used for the preparation of type B bisimide compounds are
pyromellitic dianhydride, 2,3,6,7-naphthalenetetracarboxylic dianhydride,
3,4,3',4-biphenyltetracarboxylic dianhydride, and
bis(3,4-dicarboxyphenyl)ether dianhydride.

Monoamines are aniline, p-toluidine, 4-ethylaniline, 4-n-propylaniline, 4-aminobiphenyl, and 4-amino-p-terphenyl.

The above essential raw material compounds are individually used for preparing the type A or type B bisimide compounds. Of course, other diamine compounds or dicarboxylic anhydrides can be contained in the preparation of the type A bisimide compounds and other tetracarboxylic dianhydrides or monoamine compounds can be contained in the preparation of the type B bisimide compounds, respectively, as long as not impairing the effect of the bisimide compounds in the invention.

Known imidation reactions can be applied to the preparation of bisimide compounds.

As to the amount of the raw materials, the type A bisimide compound is prepared by using commonly 2 equivalents or more, preferably 2.0~2.5 equivalents in view of complex post treatment and cost, more preferably 2.05~2.10 equivalents of dicarboxylic anhydride for 1 equivalent of the diamino compound. The type B bisimide compound is prepared by using commonly 2 equivalents or more, preferably 2.0~2.5 equivalents in view of complex post-treatment and cost, more preferably 2.05~2.10 equivalents of the monoamine compound for 1 equivalent of tetracarboxylic dianhydride.

The reaction is preferably carried out in an organic solvent in particular. N,N-Dimethylacetamide is preferably used as a solvent. Exemplary other solvents which can be used include N,N-dimethylformamide, N,N-diethylacetamide, N,N-dimethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethyl)ethane, bis[2-(2-methoxyethoxy)ethyl]ether, tetrahydrofuran, 1,3-dioxane, 1,4-dioxane, pyrroline, picoline, dimethyl sulfoxide, dimethyl sulfone, tetramethylurea, hexamethylphosphoramide, phenol, o-cresol, m-cresylic acid, p-chlorophenol, anisole, benzene, toluene and xylene. These solvents can be used singly or as a mixture.

The reaction temperature is usually 250° C. or less, preferably 150° C. or less. No particular limitation is imposed upon the reaction pressure. The reaction satisfactorily progresses under atmospheric pressure. The reaction time differs depending upon the raw material compounds, solvents and reaction temperature. The reaction time of 4~24 hours is generally sufficient for finishing the reaction.

As to imidization procedures, the precursor bisamic acid is imidized by heating at 100°~300° C. or chemically imidized by using an imidizing agent such as acetic anhydride to provide bisimide having a structure which is obtained by removing two mols of water from bisamic acid.

Known imidization reactions can also be applied to the preparation of the imide based oligomer[ingredient (b)] of the above formula (4).

The imide based oligomer can be prepared by using phthalic anhydride, 3,3'4,4'-biphenyltetracarboxylic dianhydride and diaminodiphenyl ether as raw material compounds. The amount of these raw material compounds is generally 2.0~2.3 equivalents, preferably 2.0~2.1 equivalents of diaminodiphenyl ether, and generally 2.0~2.3 equivalents, preferably 2.0~2.1 equivalents of phthalic anhydride for 1 equivalent of 3,3',4,4'-biphenyltetracarboxylic dianhydride. When the amount of diaminodiphenyl ether is less than 2 equivalents, the imide based oligomer which can be used in the invention cannot be obtained because the oligomer is converted to a polymer.

No particular restriction is put upon the reaction procedures for preparing the imide based oligomer. The reaction is usually carried out by adding diaminodiphenyl ether, phthalic anhydride and 3,3'4,4'-biphenyltetracarboxylic dianhydride to the organic solvent. The reaction procedures include:

(1) A method for reacting 3,3',4,4'-biphenyltetracarboxylic dianhydride with diaminodiphenyl ether and successively adding phthalic anhydride to continue the reaction.
(2) A method for carrying out the reaction by adding 3,3',4,4'-biphenyltetracarboxylic dianhydride, diaminodiphenyl ether and phthalic anhydride at the same time.

Any addition procedures above can be employed.

The above compounds are used as requisite raw material compounds in preparing the imide based oligomer. Oligomers comprised of other acid anhydrides can also be contained in a range giving no adverse effect on the object of the invention.

The imide based oligomer which is obtained by the above preparation process and can be used for the invention has a molecular weight distribution confirmed by gel permeation chromatograpy wherein 95% or more of the whole molecules has a polymerization degree corresponding to n=1~3 in the general formula (4).

There is quite no problem even though the residual ingredient contained in the imide based oligomer is the bisimide compound of the general formula (2-1) wherein n is zero in the general formula (4).

The inherent viscosity of the imide based oligomer which can be used in the invention is measured at 35° C. after heat dissolving in a solvent mixture of 9 parts by weight of p-chlorophenol with 1 part by weight of phenol at a concentration of 0.5 g/dl. The value of inherent viscosity is 0.1 dl/g or less, preferably 0.05~0.08 dl/g.

In the preparation of the imide based oligomer, reaction conditions such as solvent, temperature and pressure are the same as those of the above bisimide.

Further, in the preparation of the mixture of the bisimide compounds [ingredient (c)] which can be used in the invention, the bisimide compound of the above formula (2-1) is prepared according to the preparation process of the type A bisimide compound by using 4,4'-diaminodiphenyl ether, 3,4'-diaminodiphenyl ether or 3,3'-diaminodiphenyl ether as a diamine raw material compound and phthalic anhydride as a dicarboxylic anhydride raw material compound. The resulting type A bisimide compound is successively mixed with the type B bisimide compound represented by the above general formula (3-2) to obtain the ingredient (c). No particular limitation is imposed upon the mixing proportion. The mixing proportion is usually 3/7~7/3 by weight, preferably 4/6~6/4 by weight, more preferably 5/5.

The polyimide based molding resin composition having a markedly high crystallization velocity in the invention comprises polyimide [ingredient (A)] having recurring structural units of the formula (1), and a crystallization accelerator [ingredient (B)] selected from the group consisting of the bisimide compound [ingredient (a)], the imide based oligomer [ingredient (b)] and the mixture [ingredient (c)] of two bisimide compounds.

The term polyimide based molding resin composition means the composition obtained by mixing the above ingredient (A) with the ingredient (B). The term crystalline crystalline polyimide resin comprising the ingredient (A) and the ingredient (B) refers to the crystallized polyimide resin after melt-processing the composition.

The polyimide based molding resin composition of the invention has good melt-flowability in molding operation and is excellent in processing workability in molding such as injection molding. Further, the composition can provide crystalline polyimide resin by progressing crystallization even under higher cooling rate as compared with a conventional method in the cooling step after melt-processing. Thus the effect of the invention can be achieved. Actually, when polyimide to be used in the invention is processed by a conventional method, that is, as intact in the absence of the bisimide compound used in the invention, polyimide solidifies in the state of insufficient crystallization under an increased cooling rate and a molded article of amorphous polyimide is obtained. It has been required to reduce the cooling rate in order to obtain crystalline polyimide exhibiting the essential properties of polyimide for use in the invention.

When the polyimide based molding resin composition of the invention is used, crystalline polyimide can be obtained within a short cooling time by increasing the cooling rate after melt-processing. The crystalline polyimide resin thus obtained is further enhanced in properties such as chemical resistance, dimensional stability and maximum temperature for continuous use while maintaining the essential properties of polyimide of the formula (1).

The polyimide based molding resin composition of the invention is obtained by mixing 100 parts of polyimide [ingredient (A)] having recurring structural units of the formula (1) with 1~50 parts by weight, preferably 5~30 parts by weight of a crystallization accelerator [ingredient (B)] selected from the group consisting of the above bisimide compound, the mixture of two bisimide compounds and the imide based oligomer. When the proportion of the ingredient (B) is less than 1 part by weight, crystallization cannot progress sufficiently. On the other hand, the proportion exceeding 50 parts by weight results in unsatisfactory mechanical strength of injection molded articles obtained.

The composition can be prepared by mixing the above ingredients according to a conventional method. For example, polyimide powder and the bisimide compound, the mixture of two bisimide compounds or the imide based oligomer is premixed in a mortar, Henschel mixer, drum blender, tumbling mixer, ball mill or ribbon blender. The premix thus obtained is most generally kneaded with a fusion mixer or hot rolls to obtain pellets or powder mixture.

As described above, the polyimide based molding resin composition of the invention can provide a molded article comprised of the crystalline polyimide resin within a greatly reduced cooling time after melt-processing.

The polyimide based molding resin composition of the invention can be applied to various types of processing. For example, in the case of applying to injection molding, the composition is charged to a common melt-processing machine, kneaded at a fusion temperature of 390°~430° C. and successively subjected to injection molding.

After melt-processing, cooling can be carried out at a rate of 10° C./min or more. According to the measurement of crystallization energy in the cooling step with a calorimeter (manufactured by Mac. Science Co.), when polyimide of the formula (1) as intact to be used for the invention is cooled after melt-processing, a crystallization energy of 3~5 J/g is measured at a cooling rate of 7° C./min or less, and 20~25 J/g is measured at a cooling rate of 2° C./min. On the other hand, the molding composition of the invention gives crystallization energy of 20~25 J/g even at a cooling rate of 10°~20° C./min, which is an extraordinarily high rate of crystallization.

However, no limitation is put upon the cooling rate. The crystalline polyimide resin comprising 100 parts by weight of polyimide of the formula (1) and 1~50 parts by weight of the crystallization accelerator selected from the group consisting of the bisimide compound of the invention, the mixture of two specified bisimide compounds and imide based oligomer can be prepared even under a cooling rate of 10°~20° C. /min when the polyimide based molding resin composition of the invention is used for melt-processing.

Further, other thermoplastic resins can be incorporated on melt-processing the resin composition in a suitable amount giving no adverse effect on the object of the invention. Exemplary thermoplastic resins include, for example, polyethylene, polypropylene, polycarbonate, polyarylate, polyamide, polysulfone, polyether sulfone, polyphenyl sulfide, polyamidimide, polyetherimide, modified polyphenylene oxide and polyimide [formula (1) exclusive].

Additives for use in common resin compositions can also be used depending upon the object of the invention. Exemplary additives include silica powder, molybdenum disulfide, fluorine-based resin and other wear resistance improvers; glass fiber and other reinforcements; antimony trioxide, magnesium carbonate, calcium carbonate and other flame retardance improvers; clay, mica and other electrical characteristic improvers; asbestos, silica and other anti-tracking improvers; barium sulfate, silica, calcium metasilicate and other acid resistance improvers; iron powder, zinc powder, aluminum powder, copper powder and other thermal conductivity improvers; and miscellaneous materials such as glass bead, glass balloon, talc, diatomaceous earth, alumina, silicate balloon, hydrated alumina, metal oxide and colorant.

The molding composition of the invention can be incorporated with the above additives, when necessary and processed with an arbitrarily selected molding method to obtain a molded article of crystalline polyimide having excellent properties. The invention, of course, includes such molded article.

The invention will hereinafter be illustrated in detail by examples and comparative examples. Properties of bisimide compounds and imide oligomers which were obtained in synthetic examples, crystallization behavior of polyimide resin compositions in the examples and properties of molded articles were measured by the following methods.

Melting point (Tm):
  Measured with a DSC, DSC-3100 Series (manufactured by Mac. Science Co.)

Mass spectrometry (m/Z):
  Measured with a double convergent type mass spectrometer, SX-102A (manufactured by Japan Electron Optics Laboratory.)
  Ionization; E I method, Ionization voltage; 8 kV,
  Ionization current; 300 µA.

5% weight loss temperature (Td 5):
  Measured in the air with a DTA-TG, DTA-TG 2000 Series (manufactured by Mac. Science Co.)

Inherent viscosity ($\eta$inh):
  Measured at 35° C. by dissolving in a solvent mixture of p-chlorophenol/phenol(9/1 by weight ratio) at a concentration of 0.5 kg/100 ml.

Crystallization behavior:
  Crystallization temperature (Tc) and crystallization energy ($\Delta$Hc) were measured with a DSC, DSC-3100 Series (manufactured by Mac. Science Co.).
  DSC patterns were based upon the following three steps.
  ① Room temperature→(at a temperature increase rate of 20° C. /min)→420° C.
  ② 420° C.→(at a cooling rate of 20° C./min)→200° C.

③ 200° C.→(at a temperature increase rate of 20° C./min)→420° C.

Izod impact strength (IZ):

Measured in accordance with ASTM D-256.

Distortion temperature under Load (DTUL):

Measured in accordance with ASTM D-648.

I . Synthetic Examples (Synthetic examples of bisimide compounds used in the invention)

① Bisimide A

To a reaction vessel equipped with a stirrer, reflux condenser and a nitrogen inlet tube, 14.62 g (0.05 mol) of 1,4-bis(3-aminophenoxy) benzene, 16.29 g (0.11 mol) of phthalic anhydride, 0.70 g of γ-picoline, and 73.7 g of m-cresol were charged and heated to 150° C. with stirring in a nitrogen atmosphere. The mixture was successively reacted at 150° C. for 3 hours while distilling out 1.8 ml of water.

After finishing the reaction, the reaction mass was cooled to room temperature and poured into about 1 l of methanol. The precipitated powder was filtered, washed with methanol and dried in a nitrogen atmosphere, at 50° C. for 12 hours and at 230° C. for 2 hours. Bisimide powder thus obtained was 26.63 g (90.7% yield).

Table 1 illustrates purity measured by HPLC, data on mass spectrometry, 5% weight loss temperature and values of elemental analysis of the bisimide powder thus obtained.

② Bisimide B

Bisimide B was prepared by carrying out the same procedures as described in the preparation of bisimide A except that phthalic anhydride was replaced by 23.78 g (0.11 mol) of 2,3-naphthalenedicarboxylic anhydride. Table 1 illustrates yield, purity, mass spectrometric data and 5% weight loss temperature.

③ Bisimide C

To a reaction vessel equipped with a stirrer, reflux condenser and nitrogen inlet tube, 21.81 g (0.1 mol) of pyromellitic dianhydride, 23.58 g (0.22 mol) of p-toluidine, 5.60 g of γ-picoline and 181.56 g of m-cresol were charged, and heated to 150° C. with stirring in a nitrogen atmosphere. The mixture was successively reacted at 150° C. for 3 hours while distilling out 3.6 ml of water.

After finishing the reaction, the reaction mass was cooled to room temperature, about 20 ml of methanol was charged, and the separated bisimide powder was filtered. The powder was washed with methanol and dried at 50° C. for 12 hours and at 250° C. for 2 hours in a nitrogen atmosphere to obtain 75.00 g (86.8% yield) of bisimide powder.

Table 2 illustrates yield, purity, mass spectrometry data, 5% weight loss temperature (Td 5) and elemental analysis data of the bisimide compound obtained.

④ Bisimide D

Bisimide D was prepared by carrying out the same procedures as the preparation of bisimide C except that p-toluidine was replaced by aniline. Table 2 illustrates yield, mass spectrometric data and 5% weight loss temperature.

⑤ Bisimide E

Bisimide E was prepared by carrying out the same procedures as the preparation of bisimide C except that p-toluidine was replaced by p-anisidine. Table 2 illustrates yield, purity, mass spectrometric data and 5% weight loss temperature.

⑥ Bisimide F

To a reaction vessel equipped with a stirrer, reflux condenser and a nitrogen inlet tube, 29.42 g (0.1 mol) of 3,3',4,4'-biphenyltetracarboxylic dianhydride, 23.58 g (0.22 mol) of p-toluidine, 5.60 g of γ-picoline and 110.80 g of m-cresol were charged and heated to 150° C. with stirring in a nitrogen atmosphere. The mixture was thereafter reacted at 150° C. for 3 hours while distilling out 3.6 ml of water.

After finishing the reaction, the reaction mass was cooled to room temperature, about 20 ml of methanol was charged. Separated bisimide powder was filtered, washed with methanol and dried in a nitrogen atmosphere at 50° C. for 12 hours and at 250° C. for 2 hours to obtain 91.80 g (90.3% yield) of bisimide powder. Table 2 illustrates yield, mass spectrometric data, 5% weight loss temperature and elemental analysis data of the bisimide powder thus obtained.

⑦ Bisimide G

Bisimide G was prepared by carrying out the same procedures as the preparation of bisimide F except that p-toluidine was replaced by aniline. Table 2 illustrates yield, mass spectrometric data and 5% weight loss temperature.

⑧ Bisimide H

Bisimide H was prepared by carrying out the same procedures as the preparation of bisimide F except that 3,3',4,4'-biphenyltetracarboxylic dianhydride was replaced by 2,3,6,7-naphthalenetetracarboxylic dianhydride. Table 2 illustrates yield, mass spectrometric data, 5% weight loss temperature and elemental analysis data.

⑨ Bisimide I

Bisimide I was prepared by carrying out the same procedures as the preparation of bisimide F except that p-toluidine was replaced by p-n-propylaniline. Table 2 illustrates yield, purity, mass spectrometric data and 5% weight loss temperature.

⑩ Bisimide J

Bisimide J was prepared by carrying out the same procedures as the preparation of bisimide A except that 14.62 g of 1,3-bis(3-aminophenoxy) benzene was replaced by 5.40 g (0.05 mol) of p-phenylenediamine. Table 1 illustrates yield, purity, mass spectrometric data, 5% weight loss temperature and elemental analysis data.

II Synthetic Example (Synthetic examples of bisimide compounds except for use in the invention)

① Bisimide K

Bisimide K was prepared by carrying out the same procedures as the preparation of bisimide D except that 21.81 g of pyromellitic dianhydride was replaced by 40.3 g (0.1 mol) of 1,4-bis(3,4-dicarboxyphenoxy) benzene dianhydride. Table 2 illustrates yield, purity, mass spectrometric data, 5% weight loss temperature and elemental analysis data.

② Bisimide L

Bisimide L was prepared by carrying out the same procedures as the preparation of bisimide A except that 14.62 g of 1,3-bis(3-aminophenoxy)benzene was replaced by 20.03 g (0.1 mol) of 3,4'-diaminodiphenyl ether. Table 1 illustrates yield, purity, mass spectrometric data, 5% weight loss temperature and elemental analysis data.

III Synthesis of Imide Oligomers

① Imide oligomer A

To a reaction vessel equipped with a stirrer, reflux condenser and a nitrogen inlet tube, 12.02 g (0.06 mol) of 3,4'-diaminodiphenyl ether, 8.89 g (0.06 mol) of phthalic anhydride, and 83.4 g of N-methyl-2-pyrrolidone (NMP) were charged and dissolved with stirring in a nitrogen atmosphere. To the solution obtained, 8.83 g (0.03 mol) of 3,3',4,4'-biphenyltetracarboxylic dianhydride was added by portions so as to prevent temperature rise of the solution. After stirring for 24 hours, 24.5 g (0.24 mol) of acetic anhydride was dropwise added and successively NMP was charged so as to obtain a total monomer concentration of 10% by weight. Thereafter, the solution temperature was increased to 70° C. and reaction was carried out at 70° C. for 3 hours.

After finishing the reaction, the reaction mass was cooled to room temperature and poured into 1 of methanol. The separated oligomer powder was filtered, washed with methanol and dried in a nitrogen atmosphere at 50° C. for 12 hours and 180° C. for 4 hours. The oligomer powder thus obtained was 23.6 g (85.6% yield).

GPC was measured on the oligomer obtained. It was found that 99% of the molecular weight was distributed in the range corresponding units n=1~3.

Table 3 illustrates inherent viscosity, melting point and 5% weight loss temperature of the oligomer obtained.

② Imide Oligomer B

Imide Oligomer B was prepared by carrying out the same procedures as the preparation of Imide Oligomer A except that 3,4'-diaminodiphenyl ether was replaced by 3,3'-diaminodiphenyl ether. Table 3 illustrates yield, inherent viscosity, melting point and 5% weight loss temperature.

③ Imide Oligomer C

Imide Oligomer C was prepared by carrying out the same procedures as the preparation of Imide oligomer A except the 3,4'-diaminodiphenyl ether was replaced by 4,4'-diaminodiphenyl ether. Table 3 illustrates yield, inherent viscosity, melting point and 5% weight loss temperature.

EXAMPLES 1~18

Bisimide was individually added to crystalline polyimide AURUM #500 (manufactured by Mitsui Toatsu Chemicals Inc.) and thoroughly mixed in water to obtain molding compositions.

DSC was measured on a portion of these compositions. The mixing proportion of polyimide to bisimide, crystallization temperature (TC) and crystallization energy which were observed at the cooling rate of 20° C. /min were illustrates in Table 4 (I~III).

These molding compositions were individually melt kneaded with a single screw extruder having a bore diameter of 30 mm and the extruded strands were cooled in the air and cut into pellets. These pellets obtained were injection molded at a cylinder temperature of 410° C. under injection pressure of 500 kg/cm². The specimen for testing notched Izod impact strength in accordance with JIS standard was obtained by cooling the molded product to 180° C. in the mold at a cooling rate of 20° C./min. Izod impact strength (IZ) and distortion temperature under load (DTUL) are measured on the specimen obtained. Results were illustrated in Table 4 (I~III).

COMPARATIVE EXAMPLE 1

DSC was measured on AURUM alone which was essentially crystalline polyimide. Crystallization temperature could not be observed at all in the cooling step at a rate of 20° C./min. That is, the intact AURUM did not crystallize under quick cooling. Consequently, DTUL was 236° C. and was distinctly inferior to the results of Examples 1~18. The results were illustrated in Table 4(I).

COMPARATIVE EXAMPLES 2~19

Crystalline polyimide AURUM #500 (manufactured by Mitsui Toatsu Chemicals Inc.) was individually added to each bisimide in an amount outside the range of the composition in the invention. These mixtures were throughly mixed in a mortar to obtain molding compositions. DSC was measured on a portion of these compositions similar to Example 1. The mixing proportion of polyimide with bisimide and crystallization temperature (Tc) and crystallization energy which were observed in the cooling step at a rate of 20° C./min are illustrated in Table (I~III) in combination with the results of Examples.

The specimen for testing the molding composition was prepared by carrying out the same procedures as Example 1. Izod impact strength (IZ) and distortion temperature under load (DTUL) were measured on the specimen similarly to Examples. Results were illustrated in Table 4 (I ~III).

COMPARATIVE EXAMPLE 20

Crystalline polyimide AURUM #500 (manufactured by Mitsui Toatsu Chemicals Inc.) was mixed with the bisimide K in an amount within the range of the invention. The mixture was thoroughly mixed in a mortar to obtain a molding composition. DSC was measured on a portion of the composition similarly to Example 1. The mixing proportion of polyimide with bisimide and crystallization temperature (Tc) and crystallization energy which were observed in the cooling step at a rate of 20° C./min are illustrated in Table 4 (III) in combination with results of Examples.

The specimen for testing the molding composition was prepared by carrying out the same procedures as Example 1. Izod impact strength (IZ) and distortion temperature under load (DTUL) were measured on the specimen similar to the previous Examples. Results were illustrated in Table 4 (III).

EXAMPLES 19~21

The imide oligomers prepared in Synthetic Examples were individually added to crystalline polyimide AURUM #500 (manufactured by Mitsui Toatsu Chemicals Inc.) and thoroughly mixed in a mortar to obtain molding compositions. DSC was measured on a portion of these compositions. The mixing proportion of polyimide with imide oligomer and crystallization temperature (Tc) and crystallization energy which were observed in the cooling step at a rate of 20° C./min are illustrated in Table 5.

Further, these molding compositions were individually melt-kneaded with a single screw extruder having a bore diameter of 30 mm. The extruded strands were cooled in the air and cut into pellets. These pellets obtained were injection molded at a cylinder temperature of 410° C. under injection pressure of 500 kg/cm². The specimen for testing notched Izod impact strength in accordance with JIS standard was obtained by cooling the molded product to 180° C. in the mold at a cooling rate of 20° C./min. Izod impact strength (IZ) and distortion temperature under load (DTUL) were measured on the specimen obtained. Results are illustrated in Table 5.

COMPARATIVE EXAMPLES 21~26

Each imide oligomer was individually added to crystalline polyimide AURUM #500 (manufactured by Mitsui Toatsu Chemicals Inc.) in an amount outside the range of composition in the invention and thoroughly mixed in a mortar to obtain molding compositions. DSC was measured on a portion of these compositions by the same procedures as carried out in Examples 19~21. The mixing proportion of polyimide with imide oligomer and crystallization Temperature (Tc) and crystallization energy which were observed in the cooling step at a rate of 20° C./min are illustrated in Table 5.

Further, the specimen for testing the molding composition was prepared by carrying out the same procedures as the above examples. Izod impact strength (IZ) and distortion temperature under load (DTUL) were measured on the specimen by carrying out the same procedures as the above examples. Results are illustrated in Table 5.

EXAMPLES 22-24

To 100 parts by weight of crystalline polyimide AURUM #500 (manufactured by Mitsui Toatsu Chemicals Inc.), 10 parts by weight of a bisimide mixture obtained by mixing bisimide L and bisimide F which were obtained in the above synthetic examples individually in a weight ratio of 5/5, 3/7 and 7/3, were added and thoroughly mixed in a mortar to obtain molding compositions. DSC was measured on a portion of these molding compositions. The mixing proportion of polyimide to bisimide and crystallization temperature (Tc) and crystallization energy which were observed in the cooling step at a rate of 20° C./min are illustrated in Table 6.

These molding compositions were melt kneaded with a single screw extruder having a bore diameter of 30 mm. The extruded strands were cooled in the air and cut into pellets. The pellets obtained were injection molded at a cylinder temperature of 410° C. under pressure of 500 kg/cm² and the molded product was cooled to 180° C. in the mold at a cooling rate of 20° C./min to obtain a specimen for testing notched Izod impact strength in accordance with JIS standard Izod impact resistance (IZ) and distortion temperature under load (DTUL) were measured on the specimen. Results are illustrated in Table 6.

COMPARATIVE EXAMPLES 27-28

To 100 parts by weight of crystalline polyimide AURUM #500 (manufactured by Mitsui Toatsu Chemicals Inc.), 10 parts by weight of a bisimide mixture obtained by mixing bisimide L and bisimide F which were obtained in the above synthetic examples individually in a weight ratio of 5/95 and 95/5 were added and mixed thoroughly in a mortar to obtain molding compositions. DSC was measured on a portion of these compositions similarly to the examples. The mixing proportion of polyimide to bisimide and crystallization temperature (Tc) and crystallization energy which were observed in the cooling step at a rate of 20° C./min are illustrated in Table 6.

The specimens for testing the molding compositions were prepared by the same procedures as carried out in the examples.

Izod impact resistance (IZ) and distortion temperature under load (DTUL) were measured on the specimen similarly to the above examples. Results are illustrated in Table 6.

EXAMPLE 25

To 100 parts by weight of crystalline polyimide AURUM #500 (manufactured by Mitsui Toatsu Chemicals Inc.), 4 parts by weight of bisimide F obtained in the above synthetic example were added and thoroughly mixed in a mortar to obtain a molding composition. DSC was measured on a portion of the composition under conditions that the composition was heated to 420° C. at a temperature increase rate of 150° C./min, maintained at 420° C. for a minute in order to attain complete fusion, and cooled to 280° C. at a temperature decrease rate of 150° C./min. The composition was maintained at 280° C. for 10 minutes and cooled to room temperature at a temperature decrease rate of 150° C./min. The cooled composition was heated to 420° C. at a temperature increase rate of 60° C./min. The crystallization energy observed was 27.5 J/g.

EXAMPLES 26-42

Crystallization energy was measured under the same conditions as Example 25 except temperature decrease rate and temperature maintaining time. Results are illustrated in Table 7.

TABLE 1

Synthesis of bisimide (I)

| | Raw material | | Yield | Purity | | | Elemental analysis | | |
|---|---|---|---|---|---|---|---|---|---|
| | Diamine | Acid dianhydride | (%) | (%) | m/Z | Td 5 | C | H | N |
| Bisimide A | m-APB | PA | 90.7 | 98.1 | 552 | 398 | 73.91 | 3.65 | 5.07 |
| | | | | | | | 73.94 | 3.33 | 4.93 |
| Bisimide B | m-APB | NA | 92.3 | 99.5 | 652 | 420 | — | — | — |
| | | | | | | | — | — | — |
| Bisimide J | p-PD | PA | 92.3 | 92.5 | 508 | 339 | 71.74 | 3.28 | 7.61 |
| | | | | | | | 71.89 | 3.26 | 7.72 |
| Bisimide L | 3,4'-ODA | PA | 96.5 | 99.9 | 460 | 400 | 73.03 | 3.51 | 6.09 |
| | | | | | | | 72.72 | 3.69 | 5.87 |

Note)
m-APB: 1,4-Bis(3-aminophenoxy)benzene
p-PD: p-Phenylenediamine
3,4'-ODA: 3,4'-diaminodiphenylether
PA: Phthalic anhydride
NA: 2,3-Naphthalenedicarboxylic anhydride
m/Z: Mass spectrometric value
Td 5: 5% Weight loss temperature
Elemental analysis: Upper data is calculated value. Lower data is found value.

TABLE 2

Synthesis of bisimide (II)

| | Raw material | | Yield (%) | Purity (%) | m/Z | Td 5 | Elemental analysis | | |
|---|---|---|---|---|---|---|---|---|---|
| | Mono-amine | Acid anhydride | | | | | C | H | N |
| Bisimide C | p-TD | PMDA | 86.8 | 99.0 | 396 | 385 | 72.72 | 4.07 | 7.07 |
| | | | | | | | 72.47 | 3.90 | 6.87 |
| Bisimide D | AN | ⇑ | 88.0 | — | 368 | 365 | — | — | — |
| Bisimide E | p-ASD | ⇑ | 90.3 | 98.9 | 428 | 399 | — | — | — |
| Bisimide F | p-TD | BTDA | 90.3 | — | 458 | 407 | 76.26 | 4.27 | 5.93 |
| | | | | | | | 75.88 | 4.16 | 5.64 |
| Bisimide G | AN | ⇑ | 97.4 | — | 444 | 385 | — | — | — |
| Bisimide H | p-TD | NTDA | 92.4 | — | 432 | 400 | 75.33 | 4.06 | 14.33 |
| | | | | | | | 75.25 | 4.12 | 14.46 |
| Bisimide I | p-PA | BPDA | 91.3 | 99.2 | 528 | 372 | — | — | — |
| Bisimide K | AN | HQDA | 91.5 | 99.0 | 553 | 387 | 73.91 | 3.65 | 17.39 |
| | | | | | | | 73.95 | 3.62 | 17.40 |

Note)
p-TD: p-Toluidine
AN: Aniline
p-ASD: p-Anisidine
p-PA: p-n-Propylaniline
PMDA: Pyromellitic dianhydride
BTDA: 3,3',4,4'-Biphenytetracarboxylic dianhydride
NTDA: 2,3,6,7-Naphthalenetetracarboxylic dianhydride
HQDA: 1,4-Bis(3,4-dicarboxyphenoxy)benzene dianhydride
m/Z: Mass spectrometric value
Td 5: 5% Weight loss temperature
Elemental analysis: Upper data is calculated value. Lower data is found value.

TABLE 3

Synthesis of imide oligomer

| | Raw material | | | Yield (%) | η inh (dl/g) | Tm (°C.) | Td 5 (°C.) |
|---|---|---|---|---|---|---|---|
| | Diamine | Acid dianhydride | Acid anhydride | | | | |
| Imido oligomer A | 3,4'-ODA | BPDA | PA | 85.6 | 0.09 | 258 | 470 |
| Imido oligomer B | 3,3'-ODA | ⇑ | ⇑ | 84.9 | 0.08 | 233 | 456 |
| Imido oligomer C | 4,4'-ODA | ⇑ | ⇑ | 87.2 | 0.10 | 267 | 488 |

Note)
3,4'-ODA: 3,4'-diaminodiphenyl ether
3,3'-ODA: 3,3'-diaminodiphenyl ether
4,4'-ODA: 4,4'-diaminodiphenyl ether
BPDA: 3,3',4,4'-Biphenyl tetracaboxylic dianhydride
PA: Phthalic anhydride
η inh: Inherent viscosity
Tm: Melting point
Td 5: 5% Weight loss temperature

TABLE 4

Property of resin composition

| No. | Bisimide Compound | Mixing proportion (wt. part) | Tc (°C.) | ΔHc (J/G) | Iz (kg·cm/cm) | DTUL (°C.) |
|---|---|---|---|---|---|---|
| Exam. 1 | Bisimide A | 15 | 285 | 20.7 | 8 | 258 |
| Exam. 2 | Bisimide A | 10 | 290 | 15.0 | 8 | 256 |
| Exam. 3 | Bisimide A | 25 | 288 | 21.0 | 7 | 259 |
| C. Exa. 1 | — | — | N.D. | N.D. | 9 | 236 |
| C. Exa. 2 | Bisimide A | 0.5 | N.D. | N.D. | 8 | 236 |
| C. Exa. 3 | Bisimide A | 70 | 310 | 22.0 | 3 | 255 |
| Exam. 4 | Bisimide B | 15 | 284 | 19.2 | 8 | 259 |
| Exam. 5 | Bisimide B | 10 | 295 | 14.8 | 8 | 253 |
| Exam. 6 | Bisimide B | 25 | 284 | 22.0 | 7 | 262 |
| C. Exa. 4 | Bisimide B | 0.5 | N.D. | N.D. | 8 | 235 |
| C. Exa. 5 | Bisimide B | 70 | 309 | 21.0 | 3 | 256 |
| Exam. 7 | Bisimide C | 15 | 315 | 30.3 | 8 | 262 |
| Exam. 8 | Bisimide C | 10 | 322 | 27.1 | 8 | 260 |
| Exam. 9 | Bisimide C | 25 | 312 | 32.7 | 7 | 264 |
| C. Exa. 6 | Bisimide C | 0.5 | N.D. | N.D. | 8 | 236 |
| C. Exa. 7 | Bisimide C | 70 | 315 | 21.8 | 3 | 257 |
| Exam. 10 | Bisimide D | 10 | 309 | 19.1 | 8 | 256 |
| C. Exa. 8 | Bisimide D | 0.5 | N.D. | N.D. | 8 | 236 |
| C. Exa. 9 | Bisimide D | 70 | 303 | 8.6 | 3 | 250 |
| Exam. 11 | Bisimide E | 10 | 316 | 22.6 | 8 | 256 |
| C. Exa. 10 | Bisimide E | 0.5 | N.D. | N.D. | 8 | 236 |
| C. Exa. 11 | Bisimide E | 70 | 318 | 20.5 | 3 | 256 |
| Exam. 12 | Bisimide F | 10 | 322 | 28.5 | 8 | 262 |
| C. Exa. 12 | Bisimide F | 0.5 | N.D. | N.D. | 8 | 238 |
| C. Exa. 13 | Bisimide F | 70 | 322 | 21.8 | 3 | 268 |
| Exam. 13 | Bisimide G | 10 | 311 | 24.5 | 8 | 258 |
| C. Exa. 14 | Bisimide G | 0.5 | N.D. | N.D. | 8 | 237 |
| C. Exa. 15 | Bisimide G | 70 | 294 | 27.2 | 2 | 260 |
| Exam. 14 | Bisimide H | 10 | 318 | 20.9 | 8 | 259 |
| C. Exa. 16 | Bisimide H | 0.5 | N.D. | N.D. | 8 | 236 |
| C. Exa. 17 | Bisimide H | 70 | 310 | 21.3 | 3 | 257 |
| Exam. 15 | Bisimide I | 10 | 319 | 21.4 | 8 | 257 |
| C. Exa. 18 | Bisimide I | 0.5 | N.D. | N.D. | 8 | 236 |
| C. Exa. 19 | Bisimide I | 70 | 305 | 26.5 | 3 | 255 |
| Exam. 16 | Bisimide J | 10 | 293 | 3.0 | 8 | 237 |
| Exam. 17 | Bisimide J | 15 | 292 | 23.3 | 8 | 259 |
| Exam. 18 | Bisimide J | 25 | 285 | 27.5 | 7 | 262 |
| C. Exa. 20 | Bisimide K | 10 | 292 | 2.5 | 8 | 237 |

Note)
Mixing Proportion of bisimide compound: amount for 100 parts by weight of polyimide (AURUM)
Tc: crystallization temperature
ΔHc: crystallization energy
Iz: Izod impact strength
DTUL: distortion temperature under load
ND: not detected
Exam.: Example
C. Exa.: Comparative Example

TABLE 5

Property of composition

| No. | Imide based oligomer Oligomer | Mixing proportion (wt. part) | Tc (°C.) | ΔHc (J/G) | Iz (kg·cm/cm) | DTUL (°C.) |
|---|---|---|---|---|---|---|
| Exam. 19 | Oligomer A | 10 | 309 | 23.2 | 9 | 260 |
| C. Exa. 21 | Oligomer A | 0.5 | N.D. | N.D. | 9 | 236 |
| C. Exa. 22 | Oligomer A | 70 | 313 | 21.1 | 4 | 267 |
| Exam. 20 | Oligomer B | 10 | 301 | 4.1 | 9 | 259 |
| C. Exa. 23 | Oligomer B | 0.5 | N.D. | N.D. | 9 | 238 |
| C. Exa. 24 | Oligomer B | 70 | 305 | 3.5 | 3 | 265 |
| Exam. 21 | Oligomer C | 10 | 315 | 11.7 | 9 | 267 |
| C. Exa. 25 | Oligomer C | 0.5 | N.D. | N.D. | 9 | 242 |
| C. Exa. 26 | Oligomer C | 70 | 318 | 13.8 | 4 | 268 |

Note)
Mixing Proportion of imimide oligomer: amount for 100 parts by weight of polyimide (AURUM)
Tc: crystallization temperature
ΔHc: crystallization energy
Iz: Izod impact strength
DTUL: distortion temperature under load
ND: not detected
Exam.: Example
C. Exa.: Comparative Example

TABLE 6

Property of composition

| | Bisimide mixture Mixing ratio (wt) | | Mixing proportion (wt. part) | Tc (°C.) | ΔHc (J/G) | Iz (kg·cm/cm) | DTUL (°C.) |
|---|---|---|---|---|---|---|---|
| No. | Bisimide L | Bisimide F | | | | | |
| Exam. 22 | 5 | 5 | 10 | 314 | 35.2 | 8 | 260 |
| Exam. 23 | 3 | 7 | 10 | 318 | 32.8 | 8 | 260 |
| Exam. 24 | 7 | 3 | 10 | 311 | 31.8 | 8 | 260 |

TABLE 6-continued

| | Property of composition | | | | | |
|---|---|---|---|---|---|---|
| | Bisimide mixture | | | Property of composition | | |
| | Mixing ratio (wt) | | Mixing | | | |
| No. | Bisimide L | Bisimide F | proportion (wt. part) | Tc (°C.) | ΔHc (J/G) | Iz (kg·cm/cm) | DTUL (°C.) |
| C. Exa. 27 | 0.5 | 9.5 | 10 | 319 | 28.4 | 8 | 258 |
| C. Exa. 28 | 9.5 | 0.5 | 10 | 308 | 24.5 | 8 | 248 |

Note)
Mixing proportion of bisimide mixture: amount for parts by weight of polyimide (AURUM)
Tc: crystallization temperature
ΔHc: crystallization energy
Iz: Izod impact strength
DTUL: distortion temperature under load
ND: not detected
Exam.: Example
C. Exa.: Comparative Example

TABLE 7

| Example | Added bisimide | Maintained temperature (°C.) | Maintained time (min.) | Crystallization energy (J/g) |
|---|---|---|---|---|
| 25 | Bisimide F | 280 | 10 | 27.5 |
| 26 | Bisimide L | 280 | 10 | 26.2 |
| 27 | Bisimide F/L 5/5 | 280 | 10 | 28.8 |
| 28 | Bisimide F | 280 | 5 | 26.9 |
| 29 | Bisimide L | 280 | 5 | 23.4 |
| 30 | Bisimide F/L 5/5 | 280 | 5 | 27.4 |
| 31 | Bisimide F | 280 | 1 | 16.2 |
| 32 | Bisimide L | 280 | 1 | 5.0 |
| 33 | Bisimide F/L 5/5 | 280 | 1 | 18.1 |
| 34 | Bisimide F | 300 | 10 | 30.2 |
| 35 | Bisimide L | 300 | 10 | 25.2 |
| 36 | Bisimide F/L 5/5 | 300 | 10 | 30.1 |
| 37 | Bisimide F | 300 | 5 | 30.1 |
| 38 | Bisimide L | 300 | 5 | 28.6 |
| 39 | Bisimide F/L 5/5 | 300 | 5 | 26.6 |
| 40 | Bisimide F | 300 | 1 | 20.6 |
| 41 | Bisimide L | 300 | 1 | 19.0 |
| 42 | Bisimide F/L 5/5 | 300 | 1 | 25.8 |

We claim:

1. A polyimide based molding resin composition comprising: (A) 100 parts by weight of crystalline polyimide having recurring structural units of the formula (1):

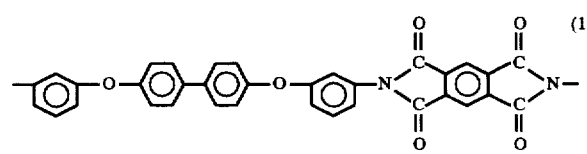

and (B) 1 to 50 parts by weight of one or more crystallization accelerators selected from the group consisting of:

(a) one or more bisimide compounds represented by the formula (2):

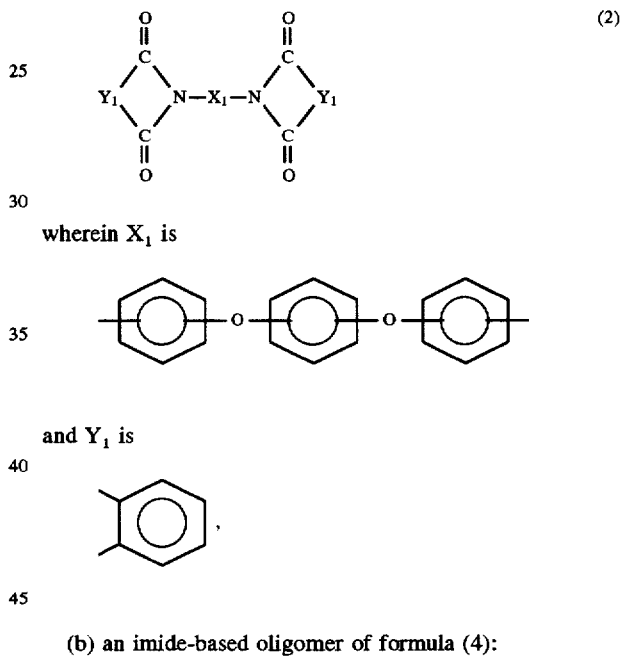

wherein $X_1$ is and $Y_1$ is (b) an imide-based oligomer of formula (4):

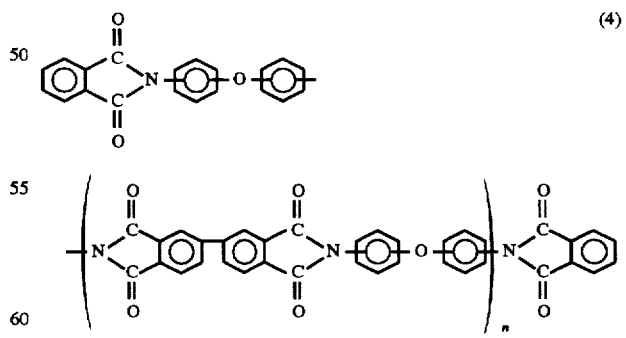

wherein n is an integer of 1~3.

2. A polyimide based molding resin composition of claim 1 wherein the crystallization accelerator is a bisimide compound of the formula (2-2):

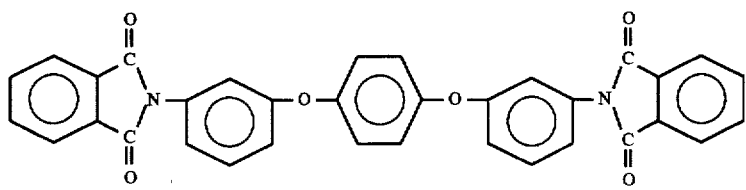
(2-2)

3. A polyimide based molding resin composition of claim 1 wherein the crystallization accelerator is an imide based oligomer of the formula (4):

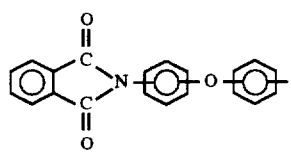  (4)

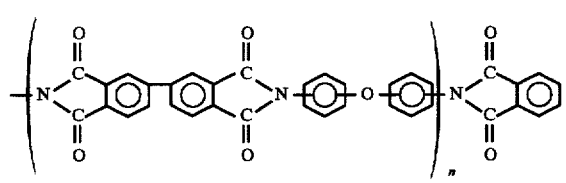

wherein n is an integer of 1–3.

4. A crystalline polyimide resin obtained by melting and cooling the polyimide based molding resin composition of claim 1.

5. A crystalline polyimide resin obtained by heat-treating the polyimide based molding resin composition of claim 1.

6. A molded article of the polyimide based resin obtained by injection molding the polyimide based molding resin composition of claim 1.

* * * * *